(No Model.)
F. E. GOLDSMITH.
SEED OR FERTILIZER DISTRIBUTER.
No. 426,993. Patented Apr. 29, 1890.
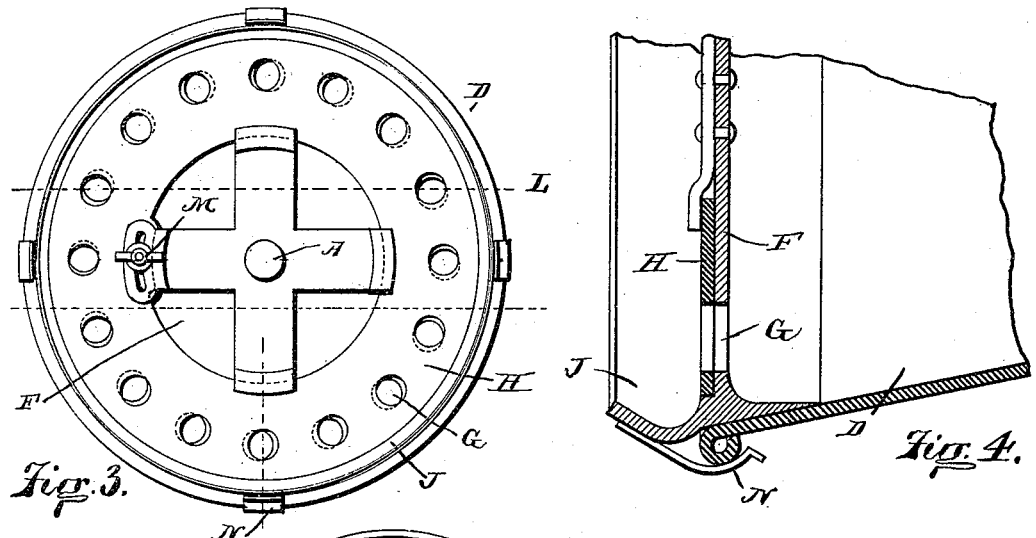
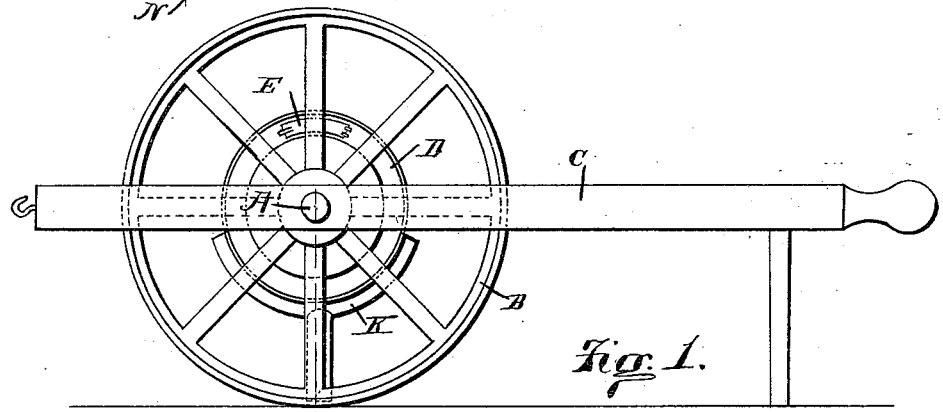
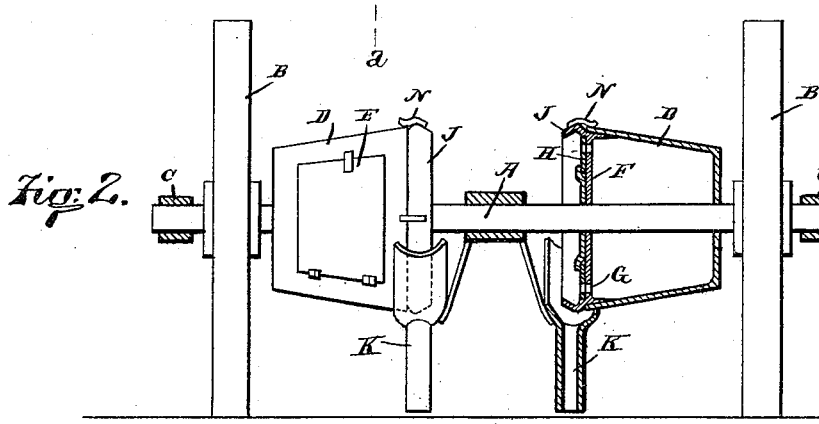
Witnesses: Frederick E. Goldsmith Inventor
A. C. Rogers. by James W. See
A. Wynne Attorney

UNITED STATES PATENT OFFICE.

FREDERICK E. GOLDSMITH, OF HAMILTON, OHIO, ASSIGNOR OF TWO-THIRDS TO WILLIAM H. ALLEN AND JOHN BURCKY, BOTH OF SAME PLACE.

SEED OR FERTILIZER DISTRIBUTER.

SPECIFICATION forming part of Letters Patent No. 426,993, dated April 29, 1890.

Application filed February 6, 1890. Serial No. 339,489. (No model.)

*To all whom it may concern:*

Be it known that I, FREDERICK E. GOLDSMITH, of Hamilton, Butler county, Ohio, have invented certain new and useful Improvements in Seeders or Fertilizers, of which the following is a specification.

This invention relates to devices for distributing seeds or fertilizing material.

My improvements will be readily understood from the following description, taken in connection with the accompanying drawings, in which—

Figure 1 is a side view of an implement exemplifying my improvements; Fig. 2, a vertical section of the same in the plane of line *a* of Fig. 1; Fig. 3, a face view of one of the distributing-vessels on an enlarged scale; and Fig. 4, a diametrical vertical section, on an enlarged scale, of the end portion of one of the distributing-vessels, this section corresponding with the lower portion of the right-hand vessel shown in Fig. 2.

In the drawings, A represents a shaft to be rotated by the advanced movement of the implement; B, the wheels which support the implement and which serve in rotating the shaft; C, the frame-work of the implement, merely exemplifying in character; D, a circular distributing-vessel secured upon the shaft A, with its axis horizontal, this vessel being intended to contain the seed or fertilizing material which is to be distributed, the illustration showing two of these vessels arranged upon the same shaft; E, a doorway in the vessel by means of which the vessel may be filled; F, one of the end walls of the vessel; G, a concentric circle of discharge-openings in the end wall F; H, a register-plate by means of which the area of the openings G may be adjusted; J, an inwardly-turned spill-rim projecting exteriorly from the end wall F of the vessel outwardly beyond the circle of discharge-openings; K, a delivery-spout arranged below the spill-rim and adapted to catch the material flowing from the spill-rim and convey it in a defined path downwardly therefrom; L, in Fig. 3, a dotted line indicative of an assumed level of the material in the distributing-vessel, it being understood, of course, that the vertical position of this line will vary according to the amount of material in the vessel; M, a screw for adjusting and fixing the adjustment of the register-plate, and N clips for securing the removable head or end of the vessel in place.

Seeding and fertilizing machines are often constructed to be moved across the field by hand and again by horses. Such implements are sometimes arranged to deliver the seed or fertilizing material continuously and sometimes intermittently, the mechanism for effecting this being sometimes actuated by the hand of the attendant and sometimes by the movement of the wheels which support the implement, and sometimes by knots upon a check-row cord or wire. My improvements are applicable to any of these systems or constructions, the present exemplification being intended to show a simple embodiment of a wheel implement provided with my improved distributing apparatus.

I show two distributing-vessels; but there may be but one or there may be any greater number.

The character of the implement is entirely immaterial to my invention so long as it is adapted to transport over the ground one or more of my improved distributing-vessels and give rotation to the same.

The discharge of seed or fertilizing material takes place through the openings G. For an unvarying character of material and an unvarying rate of discharge no means for adjusting the area of these openings will be required; but if an adjustment is desired it may be provided for by means of the illustrated register-plate or by any other well-known devices for adjusting the area of those openings. Such register-plate is a common device for the purpose of regulating the area for discharge-openings, and other devices for the same purpose are equally well known as the equivalents for the register-plate.

In distributing various kinds of materials, and especially phosphate fertilizers, great difficulty is experienced in getting the material to flow properly. Most all attempts in this direction have been based upon the idea of one or more discharge-openings arranged at the base of a mass of the material to be discharged; but many fertilizing materials will not flow by gravity from an opening at the base of a pile, the tendency being rather for the material to arch over the opening. To remedy this it has been proposed to break down the arches by agitating devices, and it has also been proposed to force the material through the opening by mechanical contrivances; but the same quality of the material which causes it to become compacted over a discharge-opening causes it to become compacted in the various internal angles of the mechanical devices depended upon for forcing it forward, and consequently these agitating and forcing devices would quickly become clogged and inoperative.

So far as I know certain kinds of fertilizing material have never been successfully discharged from an opening at a uniform rate and with certainty. It is a peculiarity of certain fertilizing materials that a column of it may be free and loose at the top and at the same time be compacted into a solid mass at the base. In my improved system I cause the discharge to take place from the top of the column, and by constantly tumbling the mass of material I insure the continual looseness of the material at that point.

Attention is now called to Fig. 3, which is an end view of the distributing-vessel provided in its end with the series of discharge-openings G. Imagine this vessel filled with fertilizing material of the character indicated up to the level of line L. The material in the lower part of the vessel will be compacted by the weight of the material above it. It will not flow freely from the open holes in the end wall of the vessel. Even at the top of the material it will settle by its own weight so compactly that it will not flow freely from the hole located directly at the top of the material. The material may be assumed as settling, so that its upper surface presents a level plane. Now rotate the vessel on its axis, say, a quarter of a rotation. This movement tips the top surface of the material to an angle. During the tipping, or a portion of it, the compacting of the mass has not been materially modified, and no discharge will take place through the openings; but when the tipping angle exceeds the angle of repose of the material then the higher portions of the mass will begin to slide downhill, the mass seeking a new level. During this act of sliding that upper portion of the material which takes part in the sliding will have become very much or entirely loosened and will reach the foot of the declivity and become immediately compact; but during the movement the loosened material will pass one or more of the discharge-openings, which are located just above the foot of the declivity, and this loose material, while thus in motion, will freely flow from those openings. When the mass has sought its new level, it will become again compact and no outflow will take place. It should be remembered that we have assumed a stationary vessel turned from stationary position into another stationary position, and that the only outflow of material that has taken place has occurred during the movement of change in position of the vessel. Now assume that the vessel is continuously rotating. From what has been said it will be readily understood that there will be constantly a mass of loose material sliding downhill and seeking a new level, and that this material will in its movement pass one or more of the discharge-openings as they present themselves to that mass. The result will be a constant outflow of loose material from such of the openings as are disposed in the path of the sliding loose material. Such a vessel as this moved across a field and constantly in rotation will therefore constantly discharge the material with a certainty that may be relied on. It will be apparent that the vessel may be applied to various kinds of field implements, it only being essential that the arrangement shall be such as to support the vessel with its axis substantially horizontal and to produce a constant rotation on that axis. The material thus flowing from the discharge-opening may fall directly to the ground, if desired; but it is preferable that it be allowed to fall into a conductor which will carry it exactly where desired. The delivery-spout K (a merely exemplifying contrivance and of obvious construction) illustrates such an arrangement. The spill-rim J is not essential, as it is obvious that the material flowing from the discharge-opening may fall directly to the delivery-spout; but the spill-rim is of value in retaining a quantity of the material in its lower portion, which will overflow continuously and fall in a continuous stream to the ground or to the delivery-spout. The discharge from the discharge-openings has been spoken of as being continuous; but this is only relatively correct. The discharge-openings represent between them a series of intervals, and consequently the discharge will take place at intervals. The spill-rim serves to catch and retain this intermittent discharge and effect a continuous distribution of it by a continuous overflow.

It will be noticed that the vessel D has the form of the frustum of a cone, the discharging end wall being at the larger end. The purpose of this construction is to cause the material to have a flowing tendency toward the discharge end of the vessel. In the exemplification I show the large end of the vessel or the end wall G as having the form of a head removably inserted in the vessel and there retained by the clips N. This permits ready access to the interior of the vessel for emptying, cleaning, &c. Such construction is, however, not essential. Owing to the peculiar nature of some fertilizing materials, whereby it tends not only to become compact under the slightest pressure, but also to adhere to surfaces formed of most materials, I have found it of great importance to avoid sharp interior angles within the vessel, and I have also found that the employment of wrought-iron, preferably galvanized, will greatly lessen the tendency toward adherence of the material to the parts.

It is essential to a realization of the virtues of my invention that the openings G should be disposed at some distance inwardly from the peripheral wall of the vessel. If the openings are located in the corner formed by the juncture between the peripheral wall of the vessel and the end wall F, the feeding of certain kinds of fertilizers will entirely fail.

I claim as my invention—

1. In a device for distributing seed or fertilizing material, the combination, substantially as set forth, of a vessel arranged with its axis substantially horizontal and provided at one of its end walls and inwardly from its peripheral wall with a circular series of discharge-openings, and devices for supporting and rotating said vessel.

2. In a device for distributing seed or fertilizing material, the combination, substantially as set forth, of a vessel arranged with its axis substantially horizontal and provided in one of its end walls with a circular series of discharge-openings, a spill-rim projecting endwise from such end wall exterior to the circle of discharge-openings, and devices for supporting and rotating said vessel on its axis.

3. In a device for distributing seed or fertilizing material, the combination, substantially as set forth, of a vessel arranged with its axis substantially horizontal and provided in one of its end walls and inwardly from its peripheral wall with a circular series of discharge openings, mechanism for adjusting the area of said openings, and devices for supporting and rotating said vessel on its axis.

4. In a device for distributing seed or fertilizing material, the combination, substantially as set forth, of a vessel arranged with its axis substantially horizontal and having the form of the frustum of a cone and provided with a circular series of discharge-openings in the end wall at its larger end and inwardly from its peripheral wall, and devices for supporting said vessel and rotating it upon its axis.

FREDERICK E. GOLDSMITH.

Witnesses:
J. W. SEE,
A. C. ROGERS.